Nov. 17, 1931.  C. H. SCHURR  1,832,507
MACHINE FOR PROFILING GEAR TEETH
Filed Oct. 15, 1926  3 Sheets-Sheet 1

INVENTOR
BY *Charles H. Schurr*
*Harry P. Canfield*
ATTORNEY.

Nov. 17, 1931.  C. H. SCHURR  1,832,507
MACHINE FOR PROFILING GEAR TEETH
Filed Oct. 15, 1926   3 Sheets-Sheet 3
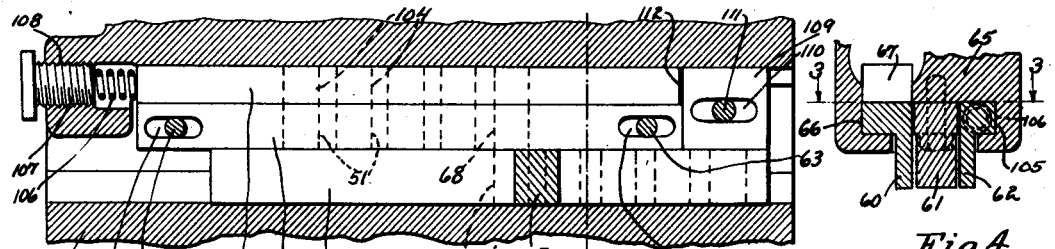
Fig.3
Fig.4
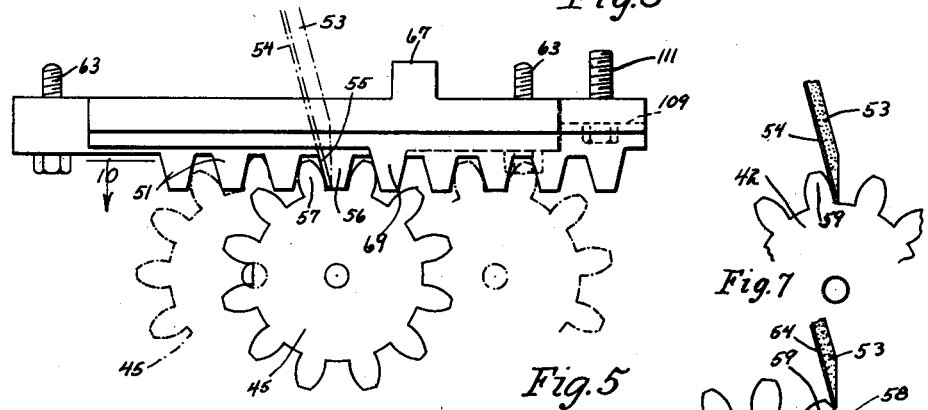
Fig.5
Fig.7
Fig.8
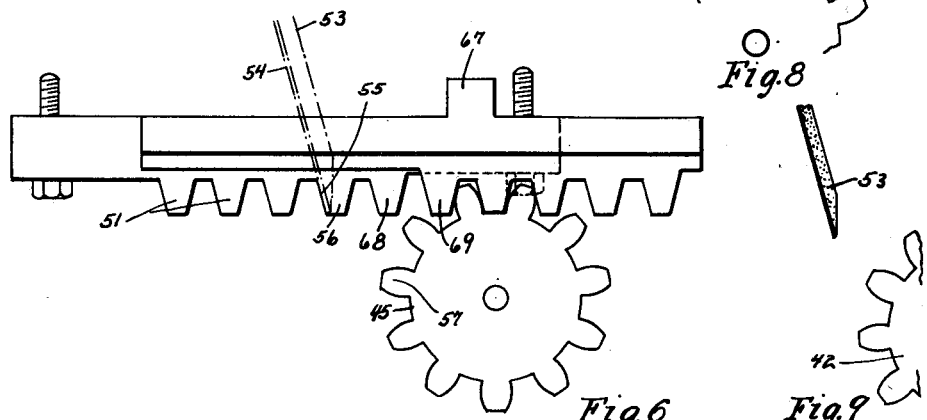
Fig.6
Fig.9
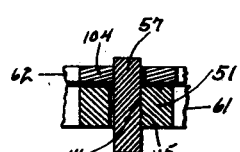
Fig.10
INVENTOR.
Charles H. Schurr
BY Harry R. Canfield
ATTORNEY.

Patented Nov. 17, 1931

1,832,507

UNITED STATES PATENT OFFICE

CHARLES H. SCHURR, OF CLEVELAND, OHIO, ASSIGNOR TO THE LEES-BRADNER COMPANY, OF CLEVELAND, OHIO, A CORPORATION OF OHIO

MACHINE FOR PROFILING GEAR TEETH

Application filed October 15, 1926. Serial No. 141,707.

This invention relates to machines for grinding or cutting gear teeth.

One of the objects of this invention is to provide an improved method of gear grinding or cutting by which the tooth profiles will be accurately shaped, and the teeth accurately and uniformly spaced apart around the gear.

Another object is to provide an improved method of gear grinding or cutting by which gear teeth may be cut or ground in a short time for rapid production purposes.

Another object is to provide an improved method of indexing the gear being cut or ground, which will be very simple and rapid in operation.

Another object is to provide an improved machine for carrying out my improved method of profiling and indexing, which will be simple, and in which the inertia of reciprocating parts will be easily absorbed and which therefore can be operated at high speed to effect a high rate of production.

Another object is to provide such a machine in which simplification is attained by arranging some of the parts of the machine so as to perform double functions, namely, functions related to moving the work gear and tool relatively to each other during the cutting or grinding of the profile, and functions related to indexing of the work gear.

Another object is to provide such a machine in which the high degree of accuracy necessary in the parts of the machine itself to effect accuracy in the work gears is confined to or concentrated in a very small number of machine parts, thus in consequence permitting the other parts of the machine to be made cheaply and with a lower degree of accuracy; and thus also confining the effects of wear on the accuracy of the work gears produced, to a very small number of machine parts which can be easily and cheaply renewed.

Other objects will be apparent to those who practice this art.

In the accompanying drawings, Fig. 1 is a side view of a machine embodying my invention showing only the essential parts thereof and with some of the parts in section and others broken away to simplify the disclosure;

Fig. 3 is a sectional view of a part of the indexing mechanism taken from the plane 3 of Figs. 1 and 4;

Fig. 4 is a sectional view taken from the plane 4 of Fig. 3;

Figs. 5 and 6 are views of a part of the indexing mechanism as viewed in Fig. 1 drawn to a larger scale, and with the parts in different positions respectively;

Figs. 7, 8 and 9 are views showing the relative positions of a grinding wheel which I may employ and the work gear while being ground thereby and indexed;

Fig. 10 is a sectional view of a part of Fig. 5 taken from the plane 10 thereof.

Fig. 11 is a view similar to Fig. 5 and showing a modification.

Fig. 12 is a view showing a modified form of a cam shown in Fig. 2.

Figure 1:
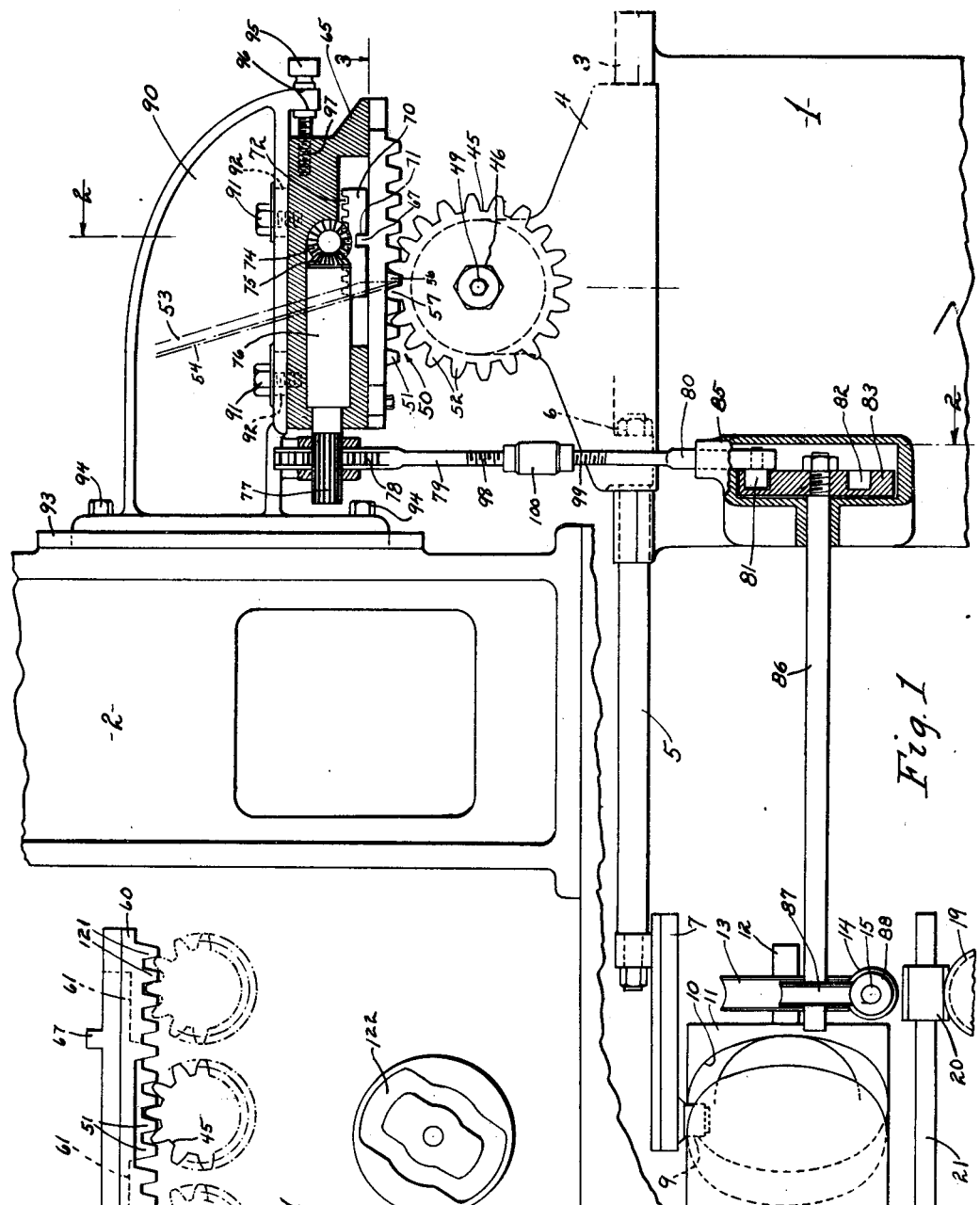

In the practice of my invention in its preferred embodiment, I provide in general, among other things, an accurately made master gear mounted on one end of a work spindle; and a gear or blank to be worked mounted on the other end of the work spindle; and I roll the master gear on an accurately made master rack to give to the work gear the proper motion relatively to the tool to profile the work gear teeth; and I provide the master rack with a plurality of rack sections, among others a working section and an indexing section movable relatively to each other; and to index the master gear, and consequently the work gear, I roll the master gear from the working section on to the indexing section, then give to the indexing section movement generally tangential to the master gear, thus turning it sufficiently to index it; and then I roll the master gear back upon the working section of the rack and in an indexed position relative thereto.

In the drawings I show at 1 and 2, the principal subdivisions of the main frame of the machine. The frame is broken away in all of the views to reveal the working parts. Because of the extensive development of this art, those skilled therein will be able to construct without detailed description herein the required details of the main frame, bearings, bearing supports, and other machine parts omitted from the drawings and description for sake of simplicity. Upon the main frame 1, I provide horizontal ways 3, and I mount thereon a reciprocable slide 4. The slide is adapted to be reciprocated by a push and pull rod 5 secured to the slide 4 by a nut 6, and to which longitudinal reciprocating movement is given in the following manner.

On the outer end of the rod 5 is secured a slide 7 adapted to travel in ways 8 stationary on the main frame; the slide 7 has on its outer end a roller 9 adapted to be engaged by the walls of a cam groove 10 in a rotatable drum 11; the drum 11 is mounted on a shaft 12 to turn therewith and the shaft 12 is rotated by a worm wheel 13 thereon; the worm wheel 13 is driven by a worm 14 mounted on a driven shaft 15 which, in turn, is driven by a driving shaft 16 through change gears 17 and 18; the driving shaft 16 receives power through a worm wheel 19 thereon from a worm 20 on a power shaft 21.

When power from any suitable source is applied in any suitable or well known manner to the power shaft 21, the worm 20 thereon turns the worm wheel 19, shaft 16, and change gear 17, and this movement is transmitted to the change gear 18, shaft 15, worm 14, worm wheel 13 and shaft 12; the shaft 12 and its cam drum 11 are thus caused to rotate continuously in one direction. The cam groove 10 in the drum 11 is so shaped that this continuous rotary movement is transmitted to the slide 7 through the cam roller 9 as reciprocating motion; and as will now be understood this reciprocating movement is transmitted to the slide 4.

Figure 2:
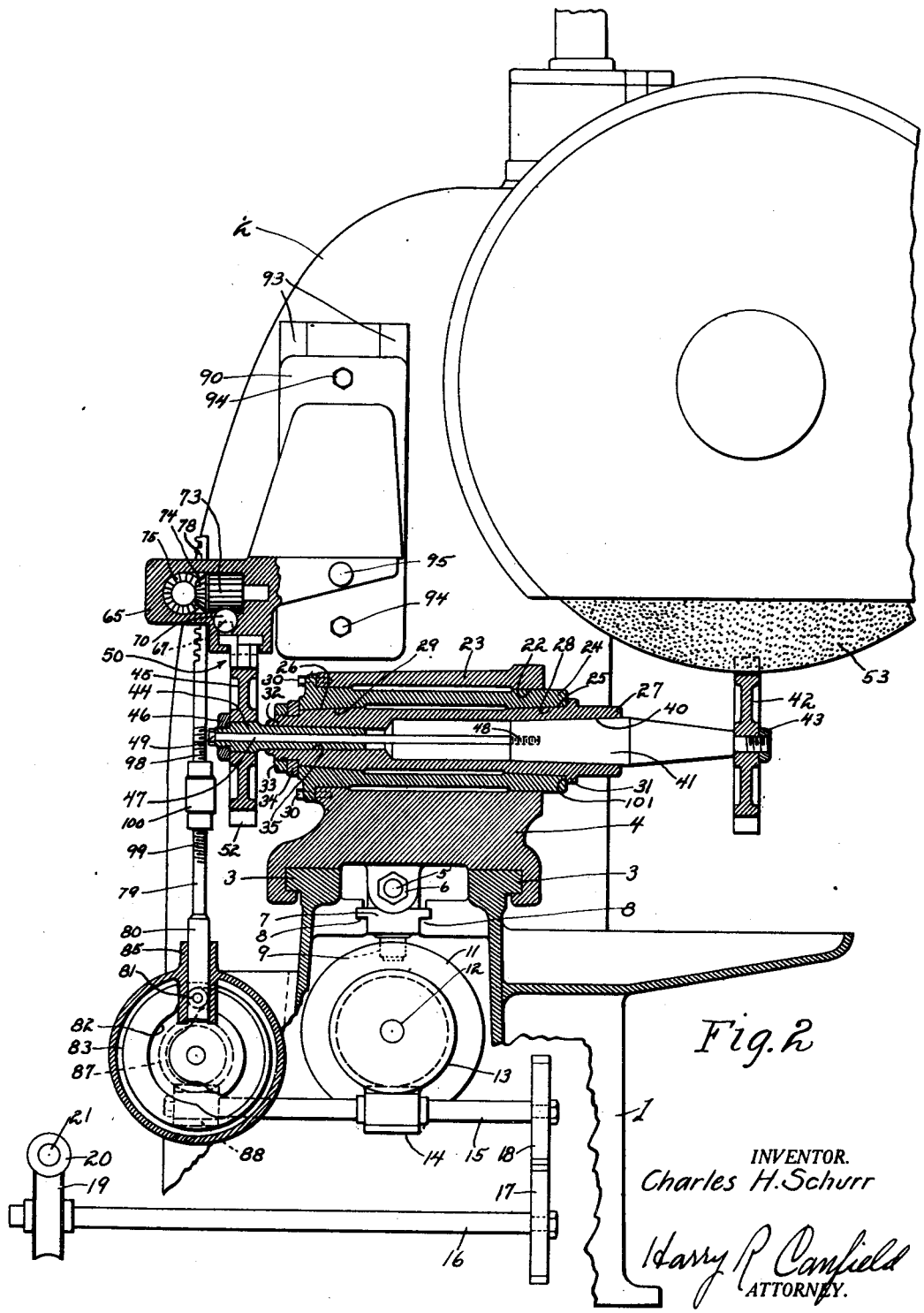
Fig. 2 is a front view of the machine of Fig. 1, partly in elevation and partly in section along the staggered line 2—2—2 of Fig. 1.

As shown in Fig. 2 and as will now be described the slide 4 carries the work spindle 27 and the bearings and housing therefor. Within a bore 22 in a housing 23 is rigidly mounted a spindle bearing 24 which, in turn, is bored out with tapering or conical bearing surfaces 28 and 29 adapted to fit and receive the conical bearing surfaces 25 and 26 of the hollow work spindle 27. The spindle bearing 24 is secured in place and against rotation in the housing 23 by screws 30. The hollow spindle 27 has at one end a flange or collar 31 rigidly secured thereon or formed integral therewith adjacent to one end of the bearing 24; and at the other end the spindle 27 terminates in a threaded portion 32, upon which a nut 33, and a bearing washer 34 are mounted; by adjustably screwing up the nut the washer is caused to engage the end of the bearing 24 and the spindle 27 is drawn into the bearing 24 to give to it a suitable and adjustable running fit therein. The collar 31 is suitably faced off at 101 to permit this.

The work spindle 27 has a tapered bore 40 in one end and a tapered bore 35 in the other end. Into the tapered bore 40 is inserted a tapered work arbor 41, on the outer end of which is mounted the work gear 42 by means of a nut 43. Into the tapered bore 35 is inserted a tapered master gear arbor 44. On the arbor 44 is mounted a master gear 45 by means of a nut 46. A rod 47 passes axially through the arbor 44 and is threaded into the arbor 41 at 48, and on its opposite end is provided with a head 49. When the head 49 is turned as with a wrench, the rod 47 is screwed into the arbor 41 and both the arbors 41 and 44 are drawn toward each other and rigidly secured in their respective tapering bores.

When it is desired to change work gears 42, as in production, the rod 47 may be unscrewed from the arbor 41 and another arbor 41 and gear 42 thereon may be substituted and drawn into place in the work spindle by the rod 47 without disturbing the tapered arbor 44 or the master gear 45. If preferred, however, the work gear 42 alone may be removed and another substituted therefor by manipulating the nut 43.

In Figs. 1 and 2 I show at 50 as an entirety a rack with the teeth of which the teeth 52 of the master gear 45 are adapted to mesh. The construction is such that as the slide 4 reciprocates on the ways 3 and carries the work spindle 27 with it, the master gear 45 on the spindle meshing with the master rack 50 will cause the master gear 45 to roll on the rack and through the work spindle 27 transmit this rolling movement to the work gear 42.

In the preferred form of my invention illustrated in the drawings, I employ a grinding wheel 53 to generate or finish the profiles of the work gear teeth. I have shown the wheel 53 and its mounting in Fig. 2 as it commonly appears in machines of this kind, and have merely indicated the wheel in Fig. 1, but it will be understood that the wheel may be mounted, rotated, and its position adjusted by any suitable or known means such for example, as that disclosed in my pending application, Serial No. 561,219. The wheel 53 may be adjusted until its planular working face 54 is brought coincident with the plane of one face 55 of one of the teeth 51—51 of the rack 50, as indicated in Figs. 1, 5 and 6. Any well known or suitable means may be employed to cause the work gear 42 on the arbor 41, or to cause both the arbor 41 and the work gear 42 to take up such a position relative to the master gear 45, that the teeth of the work gear will be in suitable alignment with the teeth of the master gear 45 for a purpose that will now be described.

From the foregoing description it will now be apparent that as the master gear 45 rolls back and forth on the rack 50, and a gear tooth such as the tooth 57 moves upon the face of a rack tooth for example upon the face 55 of the tooth 56, a tooth on the work gear 42 will be correspondingly moved upon the planular working face of the rotating grinding wheel 53; and the movement of the work gear 42 being controlled by the movement of the master gear 45, the tooth of the work gear will be worked to the same profile as that of the master gear. Referring to Fig. 5, the master gear 45 is in the position shown in solid lines at the beginning of the grinding operation; the work gear 42 and the grinding wheel 53 at this stage of the operation are shown in Fig. 7. The master gear 45 is then rolled to the left in Fig. 5 to the broken line position, and this brings the grinding wheel and work gear to the positions shown in Fig. 8, and the entire face 58 of the tooth 59 of the work gear has been passed over by the grinding wheel 53. The master gear 45 is then rolled back to the solid position Fig. 5, and the work gear 42 rolls back again to position Fig. 7, causing the wheel 53 to pass a second time over the face of gear tooth 59. The grinding operation on the tooth 59 is now finished, and the gear is ready to be indexed for work on the next tooth by the operation which will be described below.

To profile the work gear tooth faces, it is not essential that the planular face 54 of the grinding wheel 53 be in the plane of the face of a rack tooth; nor that the rack tooth faces be at the same pressure angle as the planular face of the wheel 53; nor that the teeth of the work gear 42 be in alignment with the teeth of the master gear 45; nor that the master gear 45 and work gear 42 have the same number or pitch of teeth as described in the case selected for illustration hereinbefore. Also it is not essential in substituting a new work gear 42, that it be secured on the work spindle in alignment with or in other predetermined relation to the master gear 45; it may instead be positioned with respect to the planular face of the grinding wheel 53. These facts are well known to those who practice this art.

The rack 50 consists of three sections: 60, 61 and 62. The purpose of the section 62 will be described later. The working section 61 is stationary and is an accurately made master section having the teeth 51, above referred to, upon which the master gear 45 rolls. The working section 61 is rigidly secured against movement by screws 63 passing through adjusting slots 64 therein and into an indexing mechanism housing 65. The rack section 60 is an indexing section and is mounted in ways 66 and thereby adapted to be longitudinally reciprocated in the housing 65. This section 66 has an upwardly projecting lug 67 integral therewith by which it may be reciprocated in a manner to be described hereinafter. The reciprocation of the indexing section 60 effects indexing in the following manner. During the grinding of the profile of a tooth as above described, the stationary working section 61 and the reciprocating indexing section 60 occupy the relative positions shown in Figs. 3 and 5; the last tooth 68 of the section 61 and the first tooth 69 of the section 60 are in alignment with each other, and the teeth of the two sections thus form a continuous rack. The master gear 45 in its rolling movement toward the right (Fig. 5) continues from the position shown in solid lines to the position at the right in broken lines; it thus rolls from the teeth of the working section 61, leaving them, and rolls onto the teeth of the indexing section 60. The work gear 42 and wheel 53 are now as shown in Fig. 9. When the master gear has reached the broken line position, Fig. 5, reciprocation of the indexing section 60 is caused to take place, moving it to the right to the position shown in Fig. 6. This movement rotates the master gear 45 and the work spindle and work gear 42. The extent of the rotating movement is that of the distance (pitch) between two teeth. The master gear 45 is now caused to roll back again toward the left, Figs. 5 and 6, the rack teeth still being continuous and rolls upon the stationary working section 61 leaving the movable indexing section 60, and continues its movement for the purpose of profiling a tooth on the work gear as before; but having been indexed about its axis independently of the working section 61, the master gear rolls on to the working section 61 in a new position and causes the work gear to present a new tooth to the grinding wheel 53. In this manner all of the work teeth may be ground successively. When the master gear 45 has rolled off of the indexing section 60 and back upon the working section 61, the indexing section 60 is returned from the position of Fig. 6 to its pre-indexing position of Fig. 5.

The mechanism for reciprocating the indexing rack section 60 will now be described. In the indexing mechanism housing 65, is mounted a cylindrical rack 70 having on its lower side a recess 71 adapted to receive the lug 67 of the rack section 60, and on its upper side having rack teeth 72. These rack teeth 72 are engaged by the teeth of a spur gear 73 rotatably mounted in the housing 65, and which has on one end or face thereof a bevel gear 74 meshing with another bevel gear 75 mounted on a rotatable shaft 76, which is also mounted in the housing 65 and which has, on its outer end, splines or elongated gear teeth 77. The teeth 77 are engaged by rack teeth 78 on the upper end of a vertically arranged reciprocating rod 139

79, the lower end 80 of which is preferably square in section and carries a cam roller 81 adapted to engage with the cam groove 82 of the cam 83. The square end 80 of the rod 79 enters and is guided by a four sided aperture in a cam housing 85, which housing also encloses and supports the cam 83. The cam 83 is rotated by a shaft 86 on the end of which opposite to the cam is secured a worm wheel 87 meshing with and rotated by a worm 88 mounted on the driven shaft 15 hereinbefore described. From the foregoing description it will be seen that the continuous rotation of the worm wheel 87, shaft 86 and cam 83 causes vertical reciprocation of the rod 79, the nature of the movement of which may be varied as desired by the shape of the cam groove 82, as will be understood; and that the reciprocation of the rod 79, through the agency of its rack teeth 78, in engagement with the spline teeth 77 reciprocally rotates the shaft 76; and the latter movement, through the agency of the meshing bevel gears 74 and 75, and the meshing spur gear 73 and cylindrical rack 70, reciprocates the latter which, in turn, by means of its recess 71 and the lug 67 transmits its reciprocating movement to the rack section 60.

It will now be apparent that if the master gear 45 and the working section 61 of the master rack have teeth accurately profiled and spaced, the movements of the work gear relative to the working planular face of the grinding wheel, since they are controlled by the movements of the master gear, will generate teeth on the work gear 42 accurately spaced and of accurate profile. The indexing section 60 of the rack need not be very accurately made, it being sufficient in this respect if the master gear is able to roll onto it and back onto the section 61 positively. The working section 61 of the rack and/or the master gear may be easily and cheaply replaced, when worn beyond the condition for accurate work; and wear on the work spindle and its bearings may be taken up from time to time by the construction above described. Wear, inaccuracy, lost motion, etc. in other parts of the mechanism have little or no effect on the accuracy of the gears made because the accurate meshing and rolling of the master gear on the rack is unaffected thereby.

To facilitate obtaining a high degree of accuracy in the meshing and rolling of the master gear 42 on the master rack 50 I preferably provide the rack teeth with an automatic take-up. For this purpose, I provide a third rack section 62, Figs. 3 and 4, arranged so as to be movable longitudinally in ways 105 similar to the ways 66 of the longitudinally movable indexing rack 60; one end of a compression spring 106, abutting upon the left end (as viewed in Fig. 3) of the rack section 62 exerts a resilient thrust thereon, the amount of the thrust being adjustable by a screw 107 threaded into the indexing mechanism housing 65 at 108, and against which screw the other end of the spring abuts. The rack section 62 thus tends to move toward the right (as viewed in Fig. 3) and the extreme position which it may take up is determined by, and its movement is limited by, a stop 109 having an adjustable slot 110 and a screw 111 for securing it in any adjusted position. Preferably the stop 109 is adjusted so that if the teeth 104 of the rack section 62 are placed opposite or approximately in alignment with the teeth 51 of the rack section 61, there will be a small space 112 of a few thousandths of an inch in width between the stop 109 and the end of the rack section 62. As will now be understood, when the teeth of the master gear 45 are in mesh with the teeth of the rack sections 61 and 62, the teeth of the rack section 62 will resiliently hold or press the gear teeth in the clockwise direction (as viewed in Fig. 5) against the adjacent teeth of the working rack section 60. As shown in Fig. 10 for example, a tooth 104 of the rack section 62 presses against a master gear tooth 57 and resiliently holds the face 115 of the gear tooth against the face 116 of a rack tooth 51 of the rack section 61. Thus, as will be understood, accuracy of profile and spacing of the face 116 and the other homologous faces of the rack section 61, and accuracy of profile and spacing of the face 115 and the other homologous faces of the work gear 42 are the only ones of the rack and gear which need be made with a high degree of accuracy to produce a high degree of accuracy in the profile and spacing of the teeth of the work gear, because with the arrangement just described, these are the tooth faces which by their mutual engagement determine the generating movements of the master gear and work gear. Thus also any lost motion or back lash between the gear and rack teeth is automatically taken up. When the master gear leaves the rack sections 61 and 62 to be indexed, the section 62 is free to move under the influence of the spring 106, but since it can only move the few thousandths of an inch allowed by the space 112, the rack teeth of the sections 61 and 62 will be sufficiently in alignment so that the master gear teeth, when they return to the sections 61 and 62, will again mesh with their teeth.

In order to adapt my method and mechanism to various diameters of gears to be ground, and to various pitches of the teeth thereof and to co-ordinate the movements of the various parts to each other, I provide the following adjustments. The index mechanism housing 65 is adjustably mounted in position. It is carried on a bracket 90 by screws 91 passing through elongated slots 92 in the lower side of the bracket and entering the housing 65. By this means the housing may be adjusted transversely of the axis of the work spindle. To facilitate this adjusting movement, a hand screw 95 anchored in the bracket at 96 against end movement is threaded into the housing at 97. The bracket 90 is itself mounted on the main frame 2 in ways 93 by which it may be vertically adjusted with respect to the axis of the work spindle, and is provided with screws 94 by which it may be secured in any adjusted position. The vertically reciprocating rod 79 is made in two parts 98 and 99 threaded at their adjacent ends and engaged by a turn buckle 100 by which the effective length of the rod may be varied and adjusted. The rack sections and master gear are easily removable and replaceable by others of different dimensions; and the master rack section 61 is adjustable by the slots 64. The cams 83 and 11 may easily be removed and replaced by others having grooves of other shapes to vary the nature or cycle of the reciprocating movements which they supply as follows.

By employing cam grooves 10 of shapes differing from that shown, the reciprocating movement of the work spindle may be varied; for example, it may be caused to move slowly during grinding of the work gear, and rapidly during indexing, and the speed at any part of the whole stroke of the slide and work spindle may be modified as desired. Also by varying the shape of the cam groove 82 in the cam 83, the time, amount, rate, and direction of the movements effecting indexing may be varied; for example, indexing may be caused to begin before the master gear has stopped rolling on the indexing rack, or just as it stops, or after it has stopped and started back toward the working rack section; and indexing in either of these cases may be accomplished quickly or slowly, and uniformly or at a variable rate of movement; and in either of these cases also, indexing may be performed by moving the indexing rack section 60 toward the left (as viewed in Figs. 3, 5 and 6) instead of toward the right as described hereinbefore; and the master gear may be indexed more than one tooth at a time if desired.

Furthermore, the rack 50, the cam 83 and the cam 11 may be modified so that the master gear 45 is indexed at the end of movement in each direction and the teeth of the work gear 42 are profiled by one passage of the grinding wheel 53 over the faces thereof. For these purposes a rack such as is illustrated in Fig. 11 may be provided; the work section 61 having the teeth 51 may be substantially the same as that hereinbefore described; but the indexing section 60 is provided with two sets of teeth 120—120 and 121—121. With this modification, in operation, referring to Fig. 11, the master gear 45 from the position in solid lines rolls on the teeth 51 of the working section 61 say to the right causing the grinding wheel 53 (not shown) to profile a tooth on the work gear; as described hereinbefore the master gear continuing to roll moves on to the teeth 121 of the indexing section 60; the section 60 is then moved by means of the lug 67, say toward the right, indexing the master gear 45; the master gear 45 then rolls back on to the working section 61 and causes the grinding wheel to profile a second tooth on the work gear 42; approximately at this time the indexing section 60 is caused to move toward the left back to its original position; the master gear 45 continuing to roll toward the left rolls off of the working section 61 and on to the teeth 120 of the indexing section 60; thereupon, by means of the lug 67, the indexing section 60 is again moved, say to the right, indexing the master gear 45 which latter then rolls back on to the working section 61 and causes the wheel 53 to profile a third tooth on the work gear; the indexing section 60 is then returned again to its original position and the cycle is complete. To provide a cycle of this nature a cam groove 122 similar to that of Fig. 12 may be employed in the cam 83 in place of the groove 82 shown and described hereinbefore; correspondingly the cam groove 10 of the cam 11 may be modified to increase the length of the reciprocating stroke of the slide 4 as will be understood to be necessary.

While I have shown my invention as applied to a gear grinding machine of the type having a rectilinearly moving slide it will be understood by those skilled in the art that my invention may be applied to other types of gear grinding machines.

My invention is not limited to the exact mechanism shown and described for indexing; or profile generating; or transmitting the supply of power to the various parts of the machine or controlling the same. Many changes and modifications may be made within the scope of my invention.

I claim:

1. In a gear grinding machine, a main frame, ways on the frame, a reciprocable slide on the ways, a work spindle rotatably mounted on the slide and adapted to support a work gear, a master gear on the work spindle, a stationary generating rack and a movable indexing rack on the frame positioned for meshed engagement with the master gear, a first mechanism for transmitting power from a timed power source for reciprocating the slide on the ways to roll the master gear on the racks, and a second mechanism for transmitting power from the source independently of the first for moving the indexing rack in timed relation to the movement of the slide, the racks being adjustable on the frame radially and tangentially with respect to the work spindle.

2. In a gear grinding machine, a main frame, ways on the frame, a reciprocable slide on the ways, a work spindle rotatably mounted on the slide and adapted to support a work gear, a master gear on the work spindle, a stationary generating rack and a movable indexing rack on the frame positioned for meshed engagement with the master gear, a first mechanism for transmitting power from a timed power source for reciprocating the slide on the ways to roll the master gear on the racks, and a second mechanism for transmitting power from the source independently of the first for moving the indexing rack in timed relation to the movement of the slide, the racks being adjustable on the frame radially and tangentially with respect to the work spindle, and said second power transmitting mechanism comprising transmitting elements in an extensible and contractable line of transmission whereby the mechanism is adapted to transmit power to the indexing rack at all said adjustments.

3. In a gear grinding machine, a main frame, ways on the frame, a slide on the ways, a work spindle rotatably mounted on the slide and adapted to support a work gear, a master gear on the work spindle, a rack support on the frame, a stationary generating rack and a longitudinally reciprocable indexing rack on the support positioned for meshed engagement with the master gear, a first mechanism for transmitting power from a timed power source for reciprocating the slide on the ways to roll the master gear on the racks, and a second mechanism for transmitting power from the timed power source independently of the first for positively reciprocating the indexing rack in timed relation to the movement of the slide.

4. In a gear grinding machine, a main frame, ways on the frame, a slide on the ways, a work spindle rotatably mounted on the slide and adapted to support a work gear, a master gear on the work spindle, a rack support on the frame, a stationary generating rack and a longitudinally reciprocable indexing rack on the support positioned for meshed engagement with the master gear, a first mechanism for transmitting power from a timed power source for reciprocating the slide on the ways to roll the master gear on the racks, and a second mechanism for transmitting power from the source independently of the first for reciprocating the indexing rack in timed relation to the movement of the slide, the rack support being positionally adjustable on the frame to adjust the position of the racks with respect to the work spindle.

5. In a gear grinding machine, a main frame, ways on the frame, a slide on the ways, a work spindle rotatably mounted on the slide and adapted to support a work gear, a master gear on the work spindle, a rack support on the frame, a stationary generating rack and a longitudinally reciprocable indexing rack on the support positioned for meshed engagement with the master gear, a first mechanism for transmitting power from a timed power source for reciprocating the slide on the ways to roll the master gear on the racks, and a second mechanism for transmitting power from the source independently of the first for reciprocating the indexing rack in timed relation to the movement of the slide, the rack support being positionally adjustable on the frame to adjust the position of the racks with respect to the work spindle and said second power transmitting mechanism comprising transmitting elements in an extensible and contractable line of transmission whereby the mechanism is adapted to transmit power to the indexing rack at all of said adjustments.

6. In a gear grinding machine, a main frame, ways on the frame, a slide on the ways, a work spindle rotatably mounted on the slide and adapted to support a work gear, a master gear on the work spindle, a rack support on the frame, a stationary generating rack and a longitudinally reciprocable indexing rack on the support positioned for meshed engagement with the master gear, a first mechanism for transmitting power from a timed power source for reciprocating the slide on the ways to roll the master gear on the racks, and a second mechanism for transmitting power from the source independently of the first for reciprocating the indexing rack in timed relation to the movement of the slide, the rack support being positionally adjustable on the frame and the racks being positionally adjustable on the support to adjust the racks radially and tangentially with respect to the work spindle.

7. In a gear grinding machine, a main frame, ways on the frame, a slide on the ways, a work spindle rotatably mounted on the slide and adapted to support a work gear, a master gear on the work spindle, a rack support on the frame, a stationary generating rack and a longitudinally reciprocable indexing rack on the support positioned for meshed engagement with the master gear, a first mechanism for transmitting power from a timed power source for reciprocating the slide on the ways to roll the master gear on the racks, and a second mechanism for transmitting power from the source independently of the first for reciprocating the indexing rack in timed relation to the movement of the slide, the rack support being positionally adjustable on the frame and the racks being positionally adjustable on the support to adjust the racks radially and tangentially with respect to the work spindle and said second power transmitting mechanism comprising transmitting elements in an extensible and contractable line of transmission whereby the mechanism is adapted to transmit power to the indexing rack at all of said adjustments.

8. In a gear grinding machine, a main frame, ways on the frame, a reciprocable slide on the ways, a work spindle rotatably mounted on the slide and adapted to support a work gear, a master gear on the work spindle, a rack support on the frame, a stationary generating rack and a longitudinally reciprocable indexing rack on the support positioned for meshed engagement with the master gear, a first mechanism for transmitting power from a timed power source for reciprocating the slide on the ways to roll the master gear on the racks, a second mechanism for transmitting power from the source independently of the first, for reciprocating the indexing rack on the support in timed relation to the movement of the slide, the rack support being positionally adjustable on the frame and the racks being positionally adjustable on the support to adjust the racks radially and tangentially with respect to the work spindle; said second power transmitting mechanism comprising an oscillatory gear on the support, driving connections between the gear and indexing rack to reciprocate the rack, a reciprocatory power rack meshed with the oscillatory gear, the gear having elongated teeth and the rack being adjustable in length whereby the power rack and gear are adapted to transmit power to the indexing rack at all of said adjusted positions of the rack support.

9. In a gear grinding machine, a main frame, ways on the frame, a reciprocable slide on the ways, a work spindle rotatably mounted on the slide, a master gear on the work spindle, a reciprocable element on the frame positioned for engagement with the master gear to index the gear, a first mechanism for transmitting power from a timed power source for reciprocating the slide on the ways to periodically move the master gear into engagement with the said element, and a second mechanism for transmitting power from the source independently of the first for moving the indexing element in timed relation to the movement of the slide to index the gear when in engagement with the indexing element.

10. In a gear grinding machine, a main frame, ways on the frame, a reciprocable slide on the ways, a work spindle rotatably mounted on the slide and adapted to support a work gear, an indexible element on the work spindle, a reciprocable indexing element on the frame adapted to engage the indexible element, a first mechanism for transmitting power from a timed power source for reciprocating the slide on the ways to periodically move the indexible element into and out of engagement with the indexing element, and a second mechanism for transmitting power from the source independently of the first for reciprocating the indexing element in timed relation to the movement of the slide to index the work spindle when the indexable and indexing elements are engaged.

11. In a gear grinding machine, a main frame, ways on the frame, a reciprocable slide on the ways, a work spindle rotatably mounted on the slide and adapted to support a work gear, a master gear on the work spindle, a stationary generating rack and a reciprocable indexing rack on the frame positioned for meshed engagement with the master gear, a first mechanism for transmitting power from a timed power source to reciprocate the slide on the ways to roll the master gear on the racks, and a second mechanism for transmitting power from the timed source independently of the first transmitting mechanism and including a series of positive mechanical connections between the power source and the indexing rack for positively reciprocating the indexing rack in predetermined timed relation to the reciprocatory movements of the slide.

12. In a gear grinding machine, a main frame, ways on the frame, a reciprocable slide on the ways, a work spindle rotatably mounted on the slide and adapted to support a work gear, a master gear on the work spindle, a stationary generating rack and a reciprocable indexing rack on the frame positioned for meshed engagement with the master gear, a first mechanism for transmitting power from a timed power source to reciprocate the slide on the ways to roll the master gear on the racks and from one rack to the other, and a second mechanism independent of the first for transmitting power from the source immediately to the indexing rack for moving it in one direction when the master gear is on the indexing rack to index the work spindle and for subsequently transmitting power from the source immediately to the indexing rack for moving it in the alternate direction when the master gear is on the generating rack.

13. In a gear grinding machine, a main frame, ways on the frame, a reciprocable slide on the ways, a work spindle rotatably mounted on the slide and adapted to support a work gear, an indexable element on the work spindle for indexing the spindle, a reciprocable indexing element on the frame adapted for engagement with and disengagement from the indexable element, a first mechanism for transmitting power from a timed power source to reciprocate the slide on the ways whereby to periodically bring the indexable element into engagement with the indexing element, and a second mechanism independent of the first for transmitting power from the source immediately to the indexing element for moving it in one direction when in engagement with the indexable element to index the work spindle and for subsequently transmitting power from the source immediately to the indexing element for moving it in the alternate direction when it is out of engagement with the indexable element.

14. In a gear working machine, a main frame, a tool on the frame, ways on the frame, a reciprocatory slide on the ways, a work spindle rotatably mounted on the slide and adapted to support a work piece, a master gear on the work spindle, a generating rack on the frame positioned for meshed engagement with the master gear, a first mechanism for transmitting power from a timed source for reciprocating the slide on the ways to roll the master gear on the rack and to give to the work gear a rolling generative movement relative to the tool; and an indexing mechanism for indexing the master gear relative to the generating rack including a movable element engageable with the teeth of the master gear and adapted to be moved with a to and fro movement, and a second mechanism for transmitting power from the timed source independently of the first mechanism for moving the movable element in both directions in timed relation to the movement of the slide.

15. In a gear working machine, a main frame, a tool on the frame, ways on the frame, a reciprocatory slide on the ways, a work spindle rotatably mounted on the slide and adapted to support a work piece, means for oscillating the work spindle in harmony with the reciprocations of the slide to give to a work gear on the work spindle a rolling generative movement relative to the tool, a first mechanism for transmitting power from a timed source for reciprocating the slide on the ways; and an indexing mechanism for indexing the work spindle including a circular notched element on the work spindle, a movable element adapted to be moved with a to and fro movement and to be periodically engaged with the notched element at a predetermined point in the reciprocatory movements of the slide, and a second mechanism for transmitting power from the timed source independently of the first mechanism for moving the movable element in both directions in timed relation to the movements of the slide.

In testimony whereof, I have hereunto signed my name.

CHARLES H. SCHURR.